US006669757B1

United States Patent
Lough (10) Patent No.: US 6,669,757 B1
(45) Date of Patent: *Dec. 30, 2003

(54) METHOD FOR EXTRACTING METAL FROM GLASS WASTE

(75) Inventor: Larry Lee Lough, Springdale, OH (US)

(73) Assignee: Tri E Holding, LLC, Fairfield, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 10/376,206

(22) Filed: Feb. 26, 2003

Related U.S. Application Data (63) Continuation-in-part of application No. 10/310,411, filed on Dec. 5, 2002.

(51) Int. Cl.$^7$ ................................................ C22B 3/06
(52) U.S. Cl. ....................................................... 75/743
(58) Field of Search ............................................ 75/743

(56) References Cited

U.S. PATENT DOCUMENTS

| 5,350,121 A | * | 9/1994 | Vitunac et al. ................ 241/14 |
| 5,997,718 A | * | 12/1999 | Goozner et al. ............. 205/560 |
| 6,129,779 A | | 10/2000 | Bohland et al. ............... 75/714 |

* cited by examiner

*Primary Examiner*—Melvyn Andrews
(74) *Attorney, Agent, or Firm*—Schwegman, Lundberg, Woessner & Kluth, P.A.

(57) ABSTRACT

A method and systems are provided for extracting heavy metal from glass waste. Glass is initially crushed to a diameter size between about 10 nanometers and about 2 millimeters. The glass is then added to a tank having a solution of water and acid, where the acid removes metal from the surface of the glass particles. In some embodiments, the solution and glass particles are elevated to a configurable temperature above ambient temperature and circulated for a configurable period of time. The solution is then separated from the glass particles. In some embodiments, the glass particles are then rinsed while in transit to a final destination or in a separate rinsing tank.

20 Claims, 3 Drawing Sheets

METHOD FOR EXTRACTING METAL FROM GLASS WASTE

RELATED APPLICATIONS

This application is a continuation-in-part of U.S. Ser. No. 10/310,411 filed Dec. 5, 2002, the specification of which is incorporated herein by reference.

FIELD OF THE INVENTION

The present invention is related to treatment of glass waste products, and more specifically to a method and systems for extracting heavy metals from glass waste.

BACKGROUND OF THE INVENTION

Efficient and environmentally safe techniques to recycle and dispose of glass waste still eludes the waste disposal and recycling industries. If glass waste is not safely disposed of, then the lead (or other heavy metals) included within the glass waste will leach into a community's water supply. The levels of lead within the drinking water will then exceed was is typically considered safe (5 parts per million (ppm)) and people consuming the water will then begin to experience illness and possible death.

Moreover, recycling glass is manually intensive and expensive. This is so because one vendor of glass may use different concentrations of lead in their glass products than another glass vendor. As a result, in order to recycle the glass waste, the waste must be separated into vendor specific categories so that each vendor receives glass waste that can be reused by them. Glass waste with different concentrations of lead will melt, spread, and solidify at different temperatures, and therefore glass vendors can only reuse glass waste that has the proper amount of lead concentrations that is used in their glass manufacturing process. Waste disposal facilities receive glass waste that is not separated by vendor, and the waste disposal facilities have no effective techniques for automatically separating different glass vending wastes from one another.

Because of the expense and time consuming nature associated with recycling glass waste, many waste disposal facilities have resorted to illegal disposal of glass waste. This is where the glass waste is not properly treated according to state and federal Environmental Protection Agencies (EPAs). This is extremely dangerous to the people that live near any such facility.

Glass waste associated with computer monitors, such as Cathode Ray Tube (CRT) monitors, and television sets are particular troublesome for glass recyclers and waste disposal facilities, because these monitors include high levels of lead. In the past, one solution has been to ship these monitors to other countries for disposal, such as China. However, in recent years these third-world or developing countries have started to refuse these monitors because of the health hazards this waste has created for their citizens.

Presently, the most popular and legal technique for disposing of computer monitors is a smelting technique. A smelting process melts the glass of the monitor at an extremely high temperature and then extracts the lead off the top of the liquid produced. However, the EPA has authorized this process only as a stop gap measure since no other viable technique presently exist to safely dispose of monitor glass. The reason why the EPA has only temporarily authorized this processes is because the process produces toxic gas as a byproduct and cross contaminates the glass with other toxins. Some toxins and other heavy metals produced by the smelting process include Selenium arsenic. Therefore, the EPA realizes that it cannot continue to permit the smelting process to continue indefinitely and is actively pursuing and promoting research to replace the process.

CRT disposal or television disposal is a major environmental challenge for the United States, this challenge continues to escalate as more and more organizations and people continue to buy and dispose of CRT monitors and televisions at alarming rates. The EPA has only authorized two methods of disposal for these monitors; the first is to recycle the monitors by separating glass waste into the appropriate manufacturers associated with the waste (glass-to-glass recycling). The second technique is the smelting process, which the EPA has only approved as a stopgap or emergency measure. Currently, CRT waste is the number two contributor to hazardous lead waste in the United States. This problem will only continue to grow over the next several years as liquid crystal and/or plasma screen technology is integrated into the industry and individuals/organizations accelerate their disposal rates of the CRT monitors.

Accordingly, there is a need for improved techniques to extract heavy metals from glass waste products. The techniques should be environmentally safe, efficient, and practical so that the techniques are readily embraced and adopted by waste disposal facilities.

SUMMARY OF THE INVENTION

Briefly and in general terms, a method and systems are provided for extracting heavy metals from glass waste products. The glass waste is crushed to a small size and treated with a solution of water and acid. The acid extracts the heavy metals from the surface of the glass waste. The glass particles and solution are then separated.

More specifically, and in one embodiment, a method to extract metal from glass is presented. Glass is crushed into glass particles. The glass particles having sizes that are greater than or equal to 10 nanometers and less than 2 millimeters in diameter size are filtered out from the glass particles of larger diameter sizes. The tank is filled with the filtered glass particles and a solution of water ($H_2O$) and Nitric acid ($HNO_3$). Furthermore, the solution and glass particles are circulated within the tank. Next, the solution is removed from the tank.

In still another embodiment, a system for extracting metal from glass is described. The system includes a grinding device, a screen, a conveyor, a circulating pump, and a solution pumping device. The grinding device crushes glass into glass particles. The screen filters glass particles having a size having a diameter size of greater than about 10 nanometers and less than about 2 millimeters. Moreover, the conveyor transports the filtered glass to a tank having a solution of water ($H_2O$) and acid. The circulating pump device circulates the filtered glass particles and the solution for a period of time. Finally, the solution-pumping device pumps the solution out of the tank.

In yet another embodiment, a system for extracting metal from glass is provided. The system includes a conveyor device, a solution pump, and a separating device. The conveyor device transports glass particles having a diameter size between about 10 nanometers and about 2 millimeters to a processing tank. The solution pump fills the processing tank with a solution of water and acid, where the acid removes lead from the surface of the glass particles. Furthermore, the separating device removes the glass particles from the tank and the solution.

Still other aspects of the present invention will become apparent to those of ordinary skill in the art from the

BRIEF DESCRIPTION OF THE INVENTION

DETAILED DESCRIPTION OF THE INVENTION

In the following description and the drawings illustrate specific embodiments of the invention sufficiently to enable those of ordinary skill in the art to practice it. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of the invention encompasses the full ambit of the claims and all available equivalents. The following description is, therefore, not to be taken in a limited sense, and the scope of the present invention is defined by the appended claims.

In various embodiments of the present invention, various devices, for grinding, separating, heating, holding, and moving particles or waste are used. These devices are well known to one of ordinary skill in the art and are readily available and modifiable by one of ordinary skill in the art to achieve the tenets of the present disclosure. Accordingly, when these devices are assembled and/or modified to achieve the teachings of various embodiments of the present invention, the assembled or modified system is intended to fall within the broad scope of the present disclosure.

Figure 1:
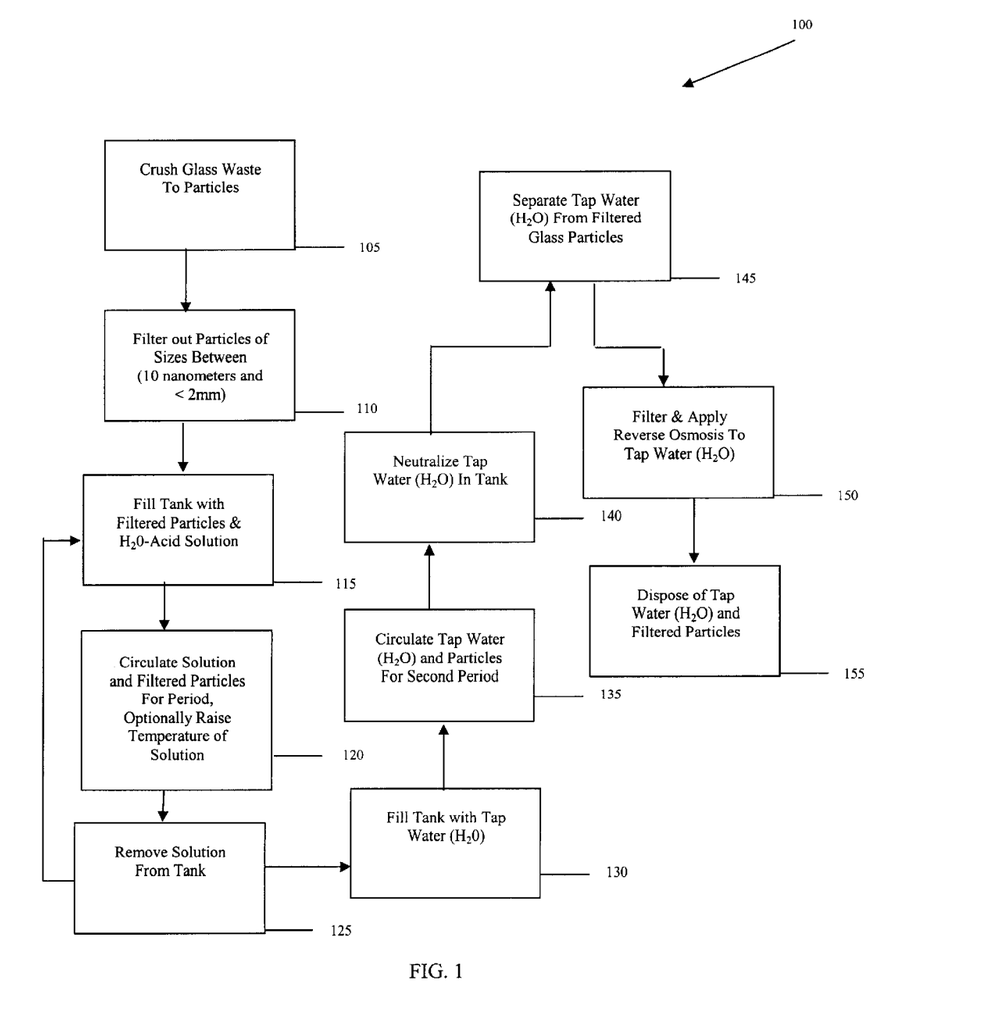
FIG. 1 is a flowchart of a method for extracting metal from glass, according to one embodiment of the present invention.

FIG. 1 illustrates a flowchart of one method 100 for extracting metal from glass, according to one embodiment of the present invention. The method 100 is achieved through the use of standard waste disposal equipment or devices. The method 100 can also be processed in any custom made equipment designed to process method 100.

As has been discussed in detail above, glass waste, particularly glass waste associated with CRT monitors or televisions, includes unacceptable levels of lead, or other heavy metals (e.g., cadmium, mercury, selenium, arsenic, and the like), that needs to be removed or decreased to acceptable levels before the glass waste can be disposed of in a landfill. Moreover, since glass waste includes varying levels of lead or other heavy metals recycling is not a practical solution because the glass waste must be separated by glass manufacture to be of any recycling use. With the present disclosure glass waste can economically and safely be disposed of well within the current EPA standards by safely and efficiently removing lead and other heavy metals from the glass waste.

At 105, the glass waste is provided to a grinding device. In some embodiments, the glass waste is fed to the grinding device by a variable speed screw conveyor made of stainless steel material. In one embodiment, the grinding device is a high-speed hammer mill, such as the high-speed hammer mill manufactured by Andela Tool of Richfield Springs, N.Y. The grinding device reduces the size of the glass waste by approximately 55% per pass through the grinding device.

In another embodiment the grinding device reduces is capable of reducing a diameter size of the glass waste to a submicron layer or approximately 10 nanometers. Once such grinding device is Cyclo Mill produced by Dayton Color, of Ohio. The grinding device uses Tungsten Carbide media that is cobalt enriched. It is capable of producing a force that approaches approximately three times the force of standard gravity. Thus, the diameter size of the glass waste reaches approximately 10 nanometers.

As the glass leaves a grinding chamber of the grinding device, a trommel separation device classifies the glass particles into particles of glass that are between about 10 nanometers and less than about 2 millimeters (mm) in diameter from those that are larger than 10 nanometers or 2 mm in diameter. The trommel separation device can be configured to classify the particles into sizes between less than 2 mm and sizes greater than approximately 10 nanometers. Particles with diameters of a configurable size between approximately 10 nanometers or approximately less than 2 mm are allowed to pass through a screen onto a conveyor device, such as a screw conveyor of stainless steel construction. Thus, at 110, glass particles between about 10 nanometers and 2 mm in diameter or less are filtered out of the supply of glass waste. Particles that are larger are reintroduced to the grinding device through a feedstock for continued grinding until all glass particles have achieved a desired diameter size between about 10 nanometers and about 2 mm or less and are filtered onto the conveyor device.

The filtered glass particles are transported on the conveyor device to a chemical processing tank. The chemical processing tank is filled with the filtered glass particles until approximately 75% of the tank is filled with the filtered glass particles. Next, a solution of acid and water is added to the tank to completely fill the tank at 115. The acid solution is approximately 14% Nitric acid ($HNO_3$) and 86% tap water ($H_2O$). Due to the small size of the filtered glass particles and the acid solution, the mixture in the tank makes a slurry mixture. In some embodiments, a different acid other than Nitric Acid ($HNO_3$) can be used, such as Hydrochloric acid (HCL), Phosphoric acid ($H_3PO_4$), or the like. Moreover, different concentrations of acid to water can be used without departing from the present disclosure.

At 120, the slurry mixture is then circulated for a period of time within the tank by use of a tank pump. In one embodiment, the tank pump is a laminar flow pump that circulates the slurry at a rate of approximately 100 gallons per minute (gpm). The period is configurable between about 1 minute and 6 hours in duration.

A 1 minute period can be achieved when the diameter of the filtered glass particles are approximate 10 nanometers in size, and when the solution is heated to a temperature of approximately 155 degrees Fahrenheit. A period between 2 to 6 hours in duration can be achieved when the diameter of the glass particles are approximate 2 mm in size and the solution is at ambient temperature. As another example, a period of approximately 40 minutes in duration can be achieved when the glass particles are approximately 2 mm in size and the solution is raised to a temperature between approximately 155 to 160 degrees Fahrenheit. In still a further example, a 5 minute period can be achieved when the diameter size of the filtered glass particles are at a submicron size and the temperature of the solution is elevated to approximately 120 degrees Fahrenheit.

As one of ordinary skill in the art appreciates, the period of circulating can be configurable based on the diameter size of the glass particles and/or the temperature of the solution, which is used during the circulating cycle. Thus, as the temperature of the solution is elevated the period of circulation decreases. Moreover, as the diameter size of the filtered glass particles decrease the period of circulation decreases. So, by reducing the diameter size of the filtered glass particles to approximately 10 nanometers and elevating the temperature to approximately 155 degrees Fahrenheit a period of 1 minute can be achieved. Upon conclusion of the circulating or mixing cycle, the acid solution is removed from the tank at 125, or the treated and filtered glass particles are filtered from the solution and the tank. Moreover, by elevating the temperature of the solution the solubility of the solution increases.

In one embodiment, the filtered glass particles are then subjected to a wash cycle starting at 130, where regular tap water is pumped into the tank. The tap water and filtered glass particle mixture is the circulated within the tank for a second period of time at 135. In one embodiment, the second period of time is about 1 hour in duration. Lime is then injected into the mixture to neutralize its acidity at 140. In one embodiment, about 10% lime is injected for 90% water.

In other embodiments, the filtered glass particles are subjected to a wash cycle or rinsing with tap water as the filtered and treated glass particles are transported to a final destination. In these embodiments, the treated glass particles are fully treated and safe for disposal once transported from a conveying device to their final destination. Thus, no second period is required at all in these embodiments. Of course a variety of other transportation and rinsing techniques can be used once the treated glass particles exit the circulating or mixing cycle. All such techniques are intended to fall within the broad scope of the present disclosure.

At 145, with embodiments requiring a washing cycle in a rinsing tank or the original processing tank, the mixture is then separated such that the neutralized tap water is separated from the filtered glass particles. In one embodiment, this separation occurs by diverting the filtered glass particles to a vorta sieve via a screw conveyor for final storage. At 150, the remaining water effluent is diverted to a bag filter to remove any suspended solids and than through a combination charcoal filter and reverse osmosis filter in order to remove any residual soluble lead or other heavy metals. At 155, the tap water and the filtered glass particles can be safely disposed of in an environmentally safe manner.

In various embodiments of the present invention, the acid solution can be reused with another cycle of glass treatment. In fact, the acid solution can be reused with more than 50 cycles, depending upon the heavy metal content of the acid solution. The tap water used for rinsing or washing the filtered glass particles is safe to dispose of in any municipality's water supply and conforms to all EPA regulations. When the acid solution has reached its useful life it can be treated as an ordinary hazardous waste stream and disposed of according to EPA regulations.

Moreover, the filtered and treated glass particles have heavy metals removed from their surface and any lead (or other heavy metals) remaining in the particles cannot be released because the force required to further break the glass particles of between about 10 nanometers or about less than 2 mm far exceeds any force that may be applied in a landfill or if the glass particles are used as a sand mixture for blacktop or concrete. In fact, any force will be dispersed throughout the particles and will not be concentrated in any specific single glass particle. As a result, the filtered and treated glass particles far exceed existing EPA regulations and can be disposed of or used in other products without environmental concern that the particles will rupture or expose the environment to lead or other heavy metals.

Furthermore, when the glass particles are circulated with the acid solution and then again, in some embodiments, with the tap water the glass particles become smooth removing any jagged edges. In fact the glass particles form the texture and appearance of typical sand.

Although various embodiments above discuss removing the acid solution and washing the glass particles, one of ordinary skill in the art readily appreciates that a variety of configurations of these steps can be used that still conform to the teachings of the present invention. For instance, the acid solution can remain in the tank with the glass particles filtered and transported to another tank for rinsing, or the glass particles can be rinsed as they are transported to a final destination. All such variations on the steps of method 100 are intended to fall within the broad scope of the present invention.

Figure 2:
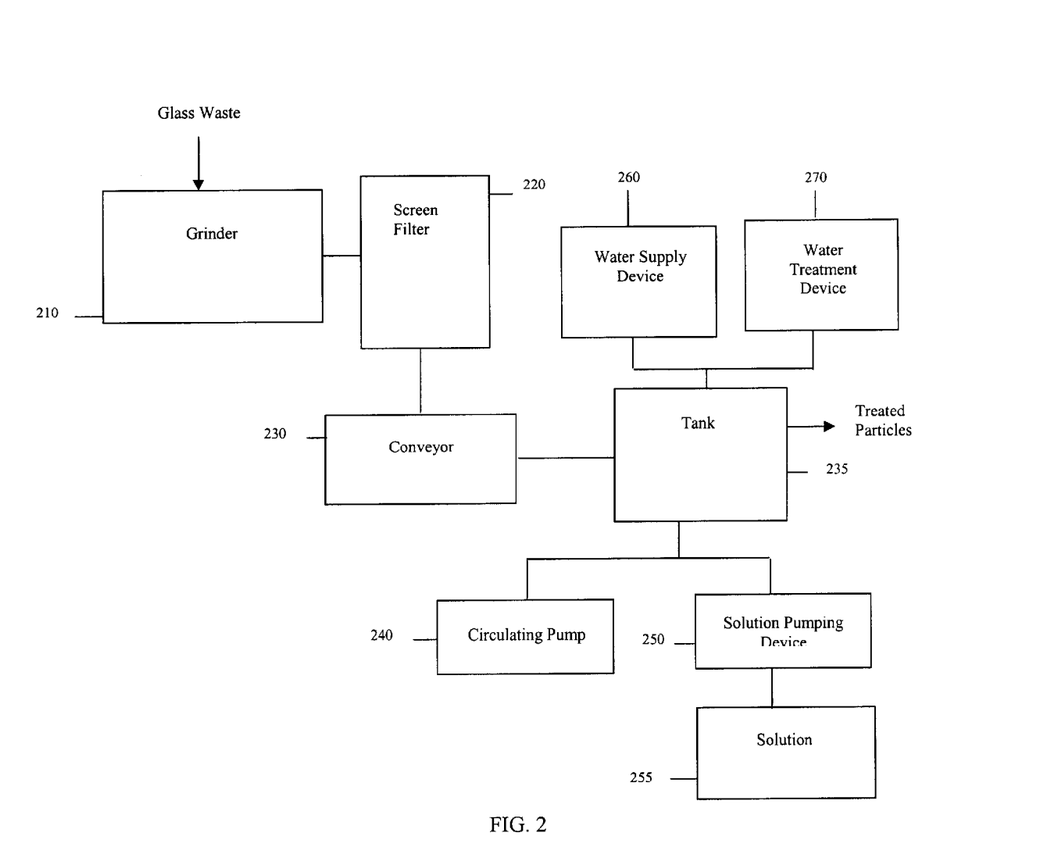
FIG. 2 is a diagram of a system for extracting metal from glass, according to one embodiment of the present invention.

FIG. 2 illustrates a diagram of one system 200 for extracting heavy metals from glass, according to one embodiment of the present invention. The metal extraction system 200 includes a grinding device 210, a screen filter 220, a conveyor 230, a circulating pump device 240, and a solution-pumping device 250. The configuration of the various components of the metal extraction system 200 are presented for purposes of illustration only and are not intended to limit the present invention, since a variety of additional components and configurations can be used to achieve the teachings of the present invention. Thus, all such additional components and configurations fall within the scope of the present invention. Moreover, the components are well known and readily available to those of ordinary skill in the art.

The grinding or crushing device 210 grinds glass waste into small particles. One such grinding device 210 that can be used is a high-speed hammer mill, such as one manufactured by Andela Tool Inc., of Richfield, N.Y. Other grinders, such as the Cyclo Mill from Dayton Color of Dayton, Ohio, can grind the glass waste to diameter sizes of submicron dimensions (e.g., approximately 10 nanometers). The glass waste can be a CRT monitor and a magnetic device can be applied to the feeding end of the grinding device 210 to extract metal waste material from the glass waste. When the glass particles have a configurable and desired diameter size or between approximately 10 nanometers and less than about 2 mm they fall through a screen filter 220 onto a conveyor device. The glass particles having a diameter of greater than configured diameter size are resent to the grinding device 210 until all the glass waste has been crushed to a diameter size desired (e.g., between about 10 nanometers and less than about 2 mm). The screen filter 220 can be associated with a trommel separation device an exit end of the grinding device 210.

The conveyor device 230 transports the filtered glass particles to a chemical treatment tank 235. In one embodiment, the conveyor device 230 is a screw conveyor of stainless steel construction. The conveyor device 230 continues to deposit the filtered glass particles into the tank 235 until a desired level or weight is achieved within the tank 235. In one embodiment, the conveyor device 230 continues to deposit the filtered glass particles into the tank 235 until the tank is approximately 75% full of filtered glass particles.

Next, an acid water solution 255 is pumped into the tank 235 to fill the tank 235 to capacity with the filtered glass particles and the added acid solution 255. In one embodiment, the solution 255 is approximately 86% water ($H_2O$) and 14% Nitric acid ($HNO_3$). In other embodiments, the acid used can be Hydrochloric acid (HCL), Phosphoric acid ($H_3PO_4$), or other acids. Moreover, the concentrations of acid to water can be altered without departing from the present disclosure. A solution-pumping device 250 is used to supply and remove the solution 255.

Once the tank is full of the acid solution 255 and the filtered glass particles, the slurry mixture is mixed within the tank 235 for a configurable period of time by using a circulating pump device 240, such as a laminar flow pump adapted to the bottom of the tank 235. The circulating pump device 240 circulates the slurry mixture at a rate of approximately 100 gpm. The period of time during which the slurry mixture is mixed or circulated within the tank 235 is a duration having a range of approximately 1 minute to approximately 6 hours. The period is determined based on the size of the diameter of the filtered glass particles and any elevated temperature of the solution 255 used during the mixing or circulation. Thus, the duration of the period is decreased as the filtered glass particles' diameter size decreases and/or as a solution's temperature is elevated above ambient temperature.

After the period of time expires, the circulating pump device 240 is shut down and the solution 255 is removed from the tank 235 using the solution-pumping device 250, or any other device designed to remove the solution 255. The solution 255 is then stored in its original holding tank (not depicted in FIG. 2) and be reused for a plurality of additional treatment cycles on additional glass waste. The solution 255 can be reused for approximately 50 iterations (depending upon the concentration levels of the heavy metal in the solution 255) of treatment cycles.

Once the solution 255 is removed from the tank 235, the tank 235, in one embodiment, is filled with regular tap water to wash or rinse the filtered glass particles of any acidic residue left by the solution 255. The tap water is supplied to the tank 235 through a water supply device 260. Moreover, the tap water is supplied until the tank 235 is completely full. The water and filtered glass particles are then circulated within the tank 235 for a second period of time. In one embodiment, the second period of time is about 1 hour.

In another embodiment, the treated or filtered glass particles are strained or filtered from the solution 255 and rinsed as the filtered glass particles are transported to their final destination. Thus, in these embodiments no second period of time is needed at all before the filtered glass particles are ready for environmentally safe disposal.

After the expiration of the second period of time, the circulating pump device 240 is shut down. Next, in one embodiment, lime is supplied to the water and filtered glass particle mixture to neutralize the acidity. In one embodiment, this is achieved by adding 10% lime for 90% tap water. The neutralized water and lime mixture is then pumped to a filter separator with the filtered glass particles diverted (e.g., via a vorta sieve, and the like) onto a screw conveyor for final storage. Of course as one or ordinary skill in the art readily appreciates, other neutralizing or precipitation agents can be used other than lime. All such agents are intended to fall within the broad scope of the present invention.

At this point, the glass particles do not have heavy metals on their surface due to the mixing cycles with the solution 255 and the tap water. Moreover, any heavy metal remaining within the filtered glass particles cannot be extracted from the filtered glass particles without a substantial and focused force directed on a single glass particle. As a practical matter conventional landfill processes will not achieve this force. Moreover, other products, such as road materials and others, can use the filtered glass particles with assurance that no exerted force that the products are subjected to will be enough to crack the filtered glass particles and release enough lead or other heavy metal (e.g., cadmium, mercury, arsenic, selenium, and others) to be considered hazardous by the EPA.

The neutralized water can then be supplied to a water treatment device 270 to make the water safe for disposal in a municipality's water supply. In one embodiment, the water treatment device 270 is a carbon filtering system combined with a reverse osmosis filtering system. After treatment, the water can be safely discharged to a sewage system of a municipality.

One of ordinary skill in the art, now appreciates how glass waste, particularly waste associated with CRT monitor disposal, can be efficiently and environmentally safely treated and disposed of with the teachings of the present invention. These techniques adhere to and exceed current EPA regulations and provide a mechanism for waste disposal facilities to economically dispose of glass waste. Moreover, the treated glass particles have the consistency of sand, since the circulating cycles have smoothed the edges of the very small glass particles. Moreover, further processing can produce spherical particles. In fact, the glass particles are no more harmful than sand would be if ingested or if they were to enter an open wound. Therefore, the glass particles can be used in a plurality of other products such as foundations for roads, mixtures for concrete, and others.

Although various devices were depicted for purposes of illustration with respect to various embodiments of FIG. 2, the present invention is not intended to be so limited. In fact, devices now known or hereafter developed which are designed to achieve the tenets of the present invention where glass is crushed to submicron particle sizes or particle sizes less than about 2 mm and then treated with an acid solution are intended to fall within the scope of the present invention.

Figure 3:
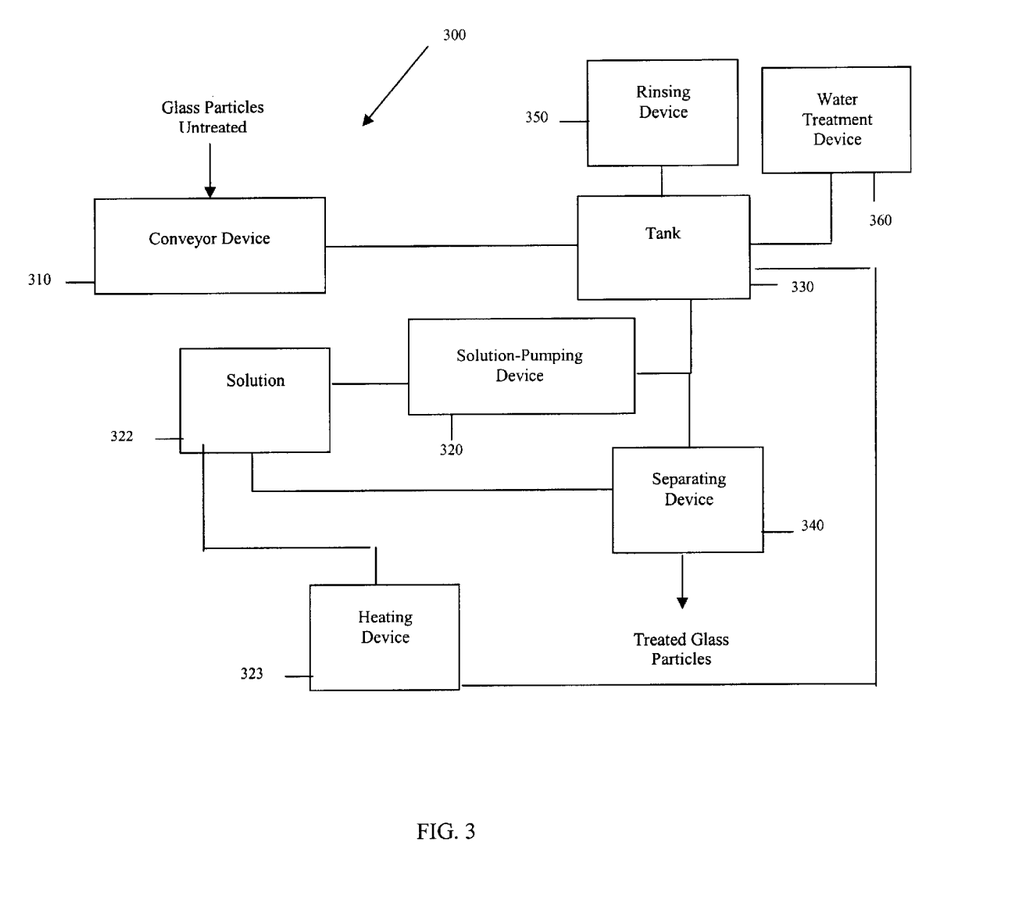
FIG. 3 is a diagram of another system for extracting metal from glass, according to one embodiment of the present invention.

FIG. 3 illustrates a diagram of another system 300 for extracting heavy metals from glass, according to one embodiment of the present invention. The metal extraction system 300 includes a conveyor device 310, a solution-pumping device 320, and a separating device 330. Untreated glass particles having a diameter of less than about 2 mm are deposited onto the conveyor device 310.

Any technique of grinding/crushing device can be used to originally deposit the glass particles onto the conveyor device 310.

The conveyor device 310, in one embodiment, is a screw conveyor of stainless steel construction. The conveyor device 310 deposits the glass particles into a processing tank 330 until a desired level or weight is reached within the tank 330. In one embodiment, the conveyor device 310 is configured to halt depositing glass particles into the tank 330 when the tank 330 is about 75% filled with the glass particles.

Next, the solution pumping device 320 pumps an acidic solution of acid and water mixture 322 into the tank 330 to bring the tank 330 to a full capacity level. In one embodiment, the acid solution 322 is a mixture of water ($H_2O$) and Nitric acid ($HNO_3$). In other embodiments, the acid can be Hydrochloric acid (HCL), Phosphoric acid ($H_3PO_4$), or other acids. Moreover, in one embodiment, the concentration of $HNO_3$ to water within the acidic solution is approximately 14%. Of course as one of ordinary skill in the art appreciates, other concentrations of $HNO_3$ can be used and different acids can be used without departing from the present invention.

In one embodiment, the acidic solution 322 and the glass particles are mixed or circulated within the tank 330 for a period of time. Mixing can occur with a solution-circulating device, such as a laminar flow pump where the mixture is circulated at a rate of approximately 100 gpm. The circulation rate and the period of time are configurable settings that can be adjusted without departing from the present invention. In one embodiment, the period of time can range between as little as 1 minute in duration and as much as 6 hours in duration. The period is determined based on the diameter size of the glass particles and any elevated temperature above ambient temperature that is used to heat the solution 322. Thus, in some embodiments, a heating device 323, can be applied directly to the solution 322 or to the tank 330 to elevate the temperature of the solution 322 that is mixed in the tank 330 with the glass particles.

When the period of time has expired, the solution 322 is removed from the tank 330 via a separation device 340, such as a screen filter and the like. The solution 322 can then be returned to its original holding tank and reused for a number of different treatment cycles. In one embodiment, the solution 322 is reused for approximately 53 treatment cycles on new untreated glass particles.

Next, a rinsing device 350 supplies ordinary tap water to the tank 330. The tank 330 has the glass particles, and the glass particles and tap water are circulated within the tank for a second period of time that is also configurable. In one embodiment, the second period of time is about 1 hour in duration. After, the second period of time elapses the water can be brought to the appropriate pH level by injecting lime (or other neutralizing or precipitation agents) into the water. Once the proper pH level is reached for tap water, the separating device 340 separates the glass particles and water, and the glass is now safe to use with other products or to be disposed of in an environmentally safe and approved manner. In other embodiments, the second period is negligible or non existent because the glass particles are rinsed using the rinsing device 350 as the treated glass particles are transported to their final destination.

Furthermore, in one embodiment, the tap water used for rinsing is subjected to a water treatment device 360, such as a carbon filtering process and/or a reverse osmosis process. Upon the conclusion of this treatment, the water is safe to dispose of in the sewage of a municipality's water supply.

Existing techniques for glass disposal are not practical, especially for CRT monitor or television disposal. Currently, only separation of each vendor's glass is acceptable for recycling and this is not easily achieved and it is not automated. The only other EPA approved solution involves a smelter process were the materials are melted at high temperature. This process is approved by the EPA only as a stopgap/emergency measure and has introduced additional pollutants into the environment. Moreover, the process is complicated and expensive to deploy. Yet, the techniques, methods, and systems of the present disclosure present economical and environmentally safe alternatives to disposing of glass waste and safely reusing glass waste in other products. This is achieved with existing equipment known and available to those of ordinary skill in the art.

Although specific embodiments have been illustrated and described herein, those of ordinary skill in the art will appreciate that any arrangement calculated to achieve the same purpose can be substituted for the specific embodiments shown. This disclosure is intended to cover any and all adaptations or variations of various embodiments of the invention. It is to be understood that the above description has been made in an illustrative fashion, and not a restrictive one. Combinations of the above embodiments, and other embodiments not specifically described herein will be apparent to one of ordinary skill in the art upon reviewing the above description. The scope of various embodiments of the invention includes any other applications in which the above structures and methods are used. Therefore, the scope of various embodiments of the invention should be determined with reference to the appended claims, along with the full range of equivalents to which such claims are entitled.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

What is claimed is:

1. A method to extract heavy metals from glass waste, comprising:
   crushing glass waste into glass particles;
   filtering the glass particles that are between 10 nanometers and 2 millimeters in diameter size producing filtered glass particles;
   filling a tank with the filtered glass particles, wherein the tank includes a solution of water ($H_2O$) and Nitric acid ($HNO_3$) producing a slurry;
   circulating the slurry thereby extracting heavy metals from the filtered glass particles and mixing the heavy metals with the solution producing treated glass particles and an acid solution that includes the extracted heavy metals and the solution; and
   removing the treated glass particles and the acid solution from the tank.

2. The method of claim 1 further comprising, elevating a temperature of the slurry while circulating the slurry.

3. The method of claim 2 further wherein in elevating the temperature, a period for circulating the slurry decreases as the temperature increases.

4. The method of claim 3 wherein in elevating the temperature, the diameter of the treated glass particles is 10 nanometers, the temperature is 155 degrees Fahrenheit, and the period is 1 minute in duration.

5. The method of claim 3 wherein in elevating the temperature, the diameter of the treated glass particles is 2 millimeters, the temperature is in an range of 155 to 160 degrees Fahrenheit, and the period is 40 minutes in duration.

6. The method of claim 3 wherein in elevating the temperature, the diameter of the treated glass particles is at a submicron size, the temperature is 120 degrees Fahrenheit, and the period is 5 minutes in duration.

7. The method of claim 1 further comprising, elevating a temperature of the slurry during circulation, wherein as the temperature increases the solubility of the slurry increases.

8. A method to extract heavy metals from glass waste, comprising:

crushing glass waste to glass particles having a diameter sizes between 10 nanometers and 2 millimeters;

creating a slurry that includes the glass particles and an acid solution;

circulating the slurry for a period of time, wherein the period of time is determined based on a temperature of the slurry, and wherein during circulation heavy metals are extracted from the glass particles producing treated glass particles and the extracted heavy metals are mixed with the acid solution producing an acid mixture; and separating the treated glass particles and the acid mixture from the slurry.

9. The method of claim 8 wherein in circulating, as the temperature of the slurry is elevated the period of time for circulating decreases.

10. The method of claim 8 wherein in crushing, as the diameter sizes of the glass particles decreases from 2 millimeters toward 10 nanometers the period of time for circulation decreases.

11. The method of claim 8 wherein in separating, the treated glass particles are left in a treatment tank and the acid mixture is pumped out of the treatment tank.

12. The method of claim 11 further comprising filling the treatment tank with tap water and circulating the treated glass particles and the tap water for an additional period of time.

13. The method of claim 8 wherein in separating, the treated glass particles are filtered out of the slurry onto a conveyor and rinsed with tap water during transport on the conveyor.

14. The method of claim 8 wherein in separating, the acid mixture is reused a second time as a new acid solution for a second processing of the method with new glass waste.

15. A method to extract heavy metals from glass waste, comprising:

crushing glass waste to produce glass particles having diameter sizes of 10 nanometers;

transporting the glass particles to a treatment tank having an acid solution;

regulating a temperature of the glass particles and the acid solution in the treatment tank; and circulating the glass particles and the acid solution within the treatment tank for a period of time based on the temperature producing treated glass particles with heavy metals extracted from the treated glass particles and the heavy metals mixed with the acid solution producing an acid solution.

16. The method of claim 15 further comprising pumping the acid solution out of the treatment tank.

17. The method of claim 15 further comprising filtering the treated glass particles out of the treatment tank.

18. The method of claim 15 wherein in circulating, the period of time for circulating decreases as the temperature is increased during regulating.

19. The method of claim 15 wherein in circulating, the period of time for circulating increases as the temperature is decreased during regulating.

20. The method of claim 15 wherein in regulating, the temperature of the acid solution and the glass particles is elevated to 155 degrees Fahrenheit within the treatment tank, and the period for circulating is 1 minute.

* * * * *

UNITED STATES PATENT AND TRADEMARK OFFICE
CERTIFICATE OF CORRECTION

PATENT NO. : 6,669,757 B1  
DATED : December 30, 2003  
INVENTOR(S) : Lough

Page 1 of 1

It is certified that error appears in the above-identified patent and that said Letters Patent is hereby corrected as shown below:

<u>Title page, Item [54] and Column 1, lines 1-2,</u>  
Title, should read -- METHOD AND SYSTEM FOR EXTRACTING METAL FROM GLASS WASTE --

<u>Column 10,</u>  
Line 62, delete "an" and insert -- a --, therefor.

Signed and Sealed this

Fourth Day of May, 2004

JON W. DUDAS  
*Acting Director of the United States Patent and Trademark Office*